United States Patent [19]
Yu

[11] Patent Number: 5,775,710
[45] Date of Patent: Jul. 7, 1998

[54] BICYCLE SADDLE

[75] Inventor: Tsai-Yun Yu, Taichung Hsien, Taiwan

[73] Assignee: Selle Tech Industrial Co., Ltd., Taiwan

[21] Appl. No.: 700,027

[22] Filed: Aug. 20, 1996

[51] Int. Cl.$^6$ ........................................... B62J 1/02
[52] U.S. Cl. ............................... 280/283; 297/195.1
[58] Field of Search ............................ 280/274, 275, 280/281.1, 283; 297/195.1, 199, 200, 208, 209, 211

[56] References Cited

U.S. PATENT DOCUMENTS

| | | | |
|---|---|---|---|
| 5,308,140 | 5/1994 | Yu | 297/195.1 |
| 5,356,198 | 10/1994 | Hughes | 297/195.1 |
| 5,507,476 | 4/1996 | Lin | 267/132 |
| 5,558,396 | 9/1996 | Yu | 297/208 |
| 5,692,801 | 12/1997 | Yu | 297/195.1 |

*Primary Examiner*—Kevin Hurley
*Attorney, Agent, or Firm*—Ladas & Parry

[57] ABSTRACT

A bicycle saddle includes a saddle body with a front converging portion and a rear diverging portion, a front mounting socket member formed at the bottom side of the front converging portion, a pair of spaced rear mounting posts which project downwardly from the bottom side of the rear diverging portion, a support rod with a converging bent front end to be mounted to the front mounting socket member and two diverging arms with bent hook portions to be mounted on the rear mounting posts respectively, and a pair of hook engaging members, each of which has a peripheral groove. Each hook portion extends around the respective hook engaging member and is received in the peripheral groove thereof. The hook engaging members are mountable on the mounting posts respectively after engaging the hook portions.

5 Claims, 5 Drawing Sheets

5,775,710

1

BICYCLE SADDLE

BACKGROUND OF THE INVENTION

1. Field of the Invention

This invention relates to a bicycle saddle, more particularly to a saddle body which includes a support that incorporates a resilient body made of an elastomer such as polyurethane.

2. Description of the Related Art

Referring to FIG. 1, a conventional bicycle saddle 10 is shown to comprise a saddle body 11 and a bracket 12. The saddle body 11 has a front converging portion with a mounting socket 111 on its bottom side, and a rear diverging portion with two mounting sockets 112 on its bottom side. The bracket 12 is mounted to the bottom side of the saddle body 11 and is connected to a coupler 21 of a seat post 20. The bracket 12 is formed by bending a metal rod and has a front bent portion 121 to be inserted into the mounting socket 111. The arm portions 122 are inserted into the mounting sockets 112. The construction as such suffers from a problem in that a considerably large force is needed to deform the bracket 12 in order to fit the front bent portion 121 and the arm portions 122 into the sockets 111 and 112. Another problem encountered with the before mentioned construction arises from insufficient shock absorbing characteristics. When the saddle body is subjected to the force (F) of a load, the force (F) is transmitted directly to the arm portions 122 of the bracket 12. A counteracting force (R) is produced by the bracket 12 and is transferred back to the saddle body 11 via the portions 121 and 122. Therefore, the user suffers from discomfort when the saddle is subjected to shock.

SUMMARY OF THE INVENTION

An objective of the present invention is to provide a bicycle saddle which can be easily assembled without using a large force to deform the bracket of the saddle.

Another object of the present invention is to provide a bicycle saddle with an enhanced shock-absorbing capability.

According to this invention, a bicycle saddle comprises a saddle body with a front converging portion and a rear diverging portion, a front mounting socket member formed at the bottom side of the front converging portion, a pair of spaced rear mounting posts which project downwardly from the bottom side of the rear diverging portion, a support rod with a converging bent front end to be mounted to the front mounting socket member and two diverging arms with hook portions to be mounted on the rear mounting posts respectively, and a pair of hook engaging members, each of which has a peripheral groove. Each hook portion extends around the respective hook engaging member and is received in the peripheral groove thereof. The hook engaging members are mountable on the mounting posts respectively after engaging the bent hook portions.

BRIEF DESCRIPTION OF THIS DRAWINGS

Other features and advantages of the present invention will become apparent in the following detailed description of a preferred embodiment of the invention, with reference to the accompanying drawings, in which.

2

Figure 3:
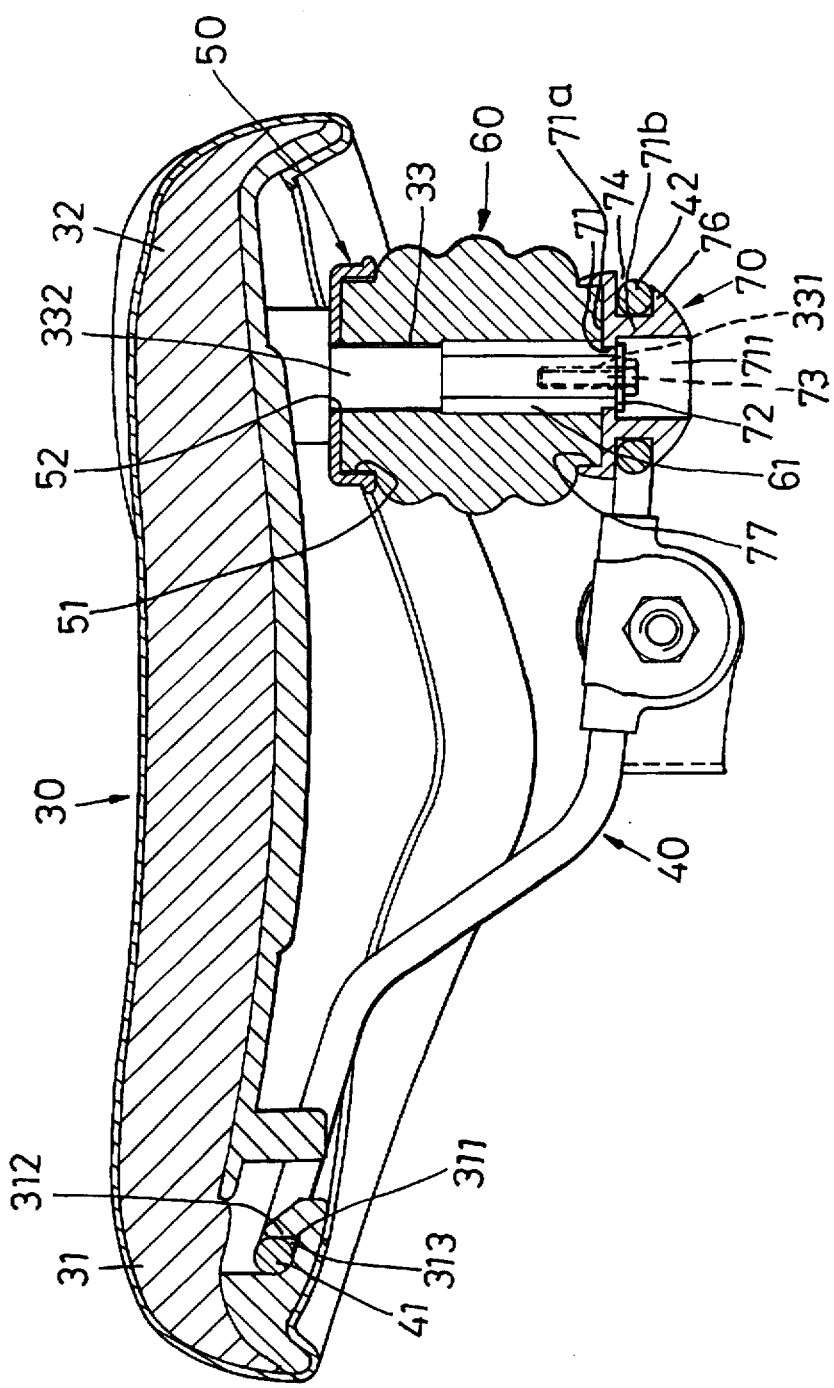
Figure 4:
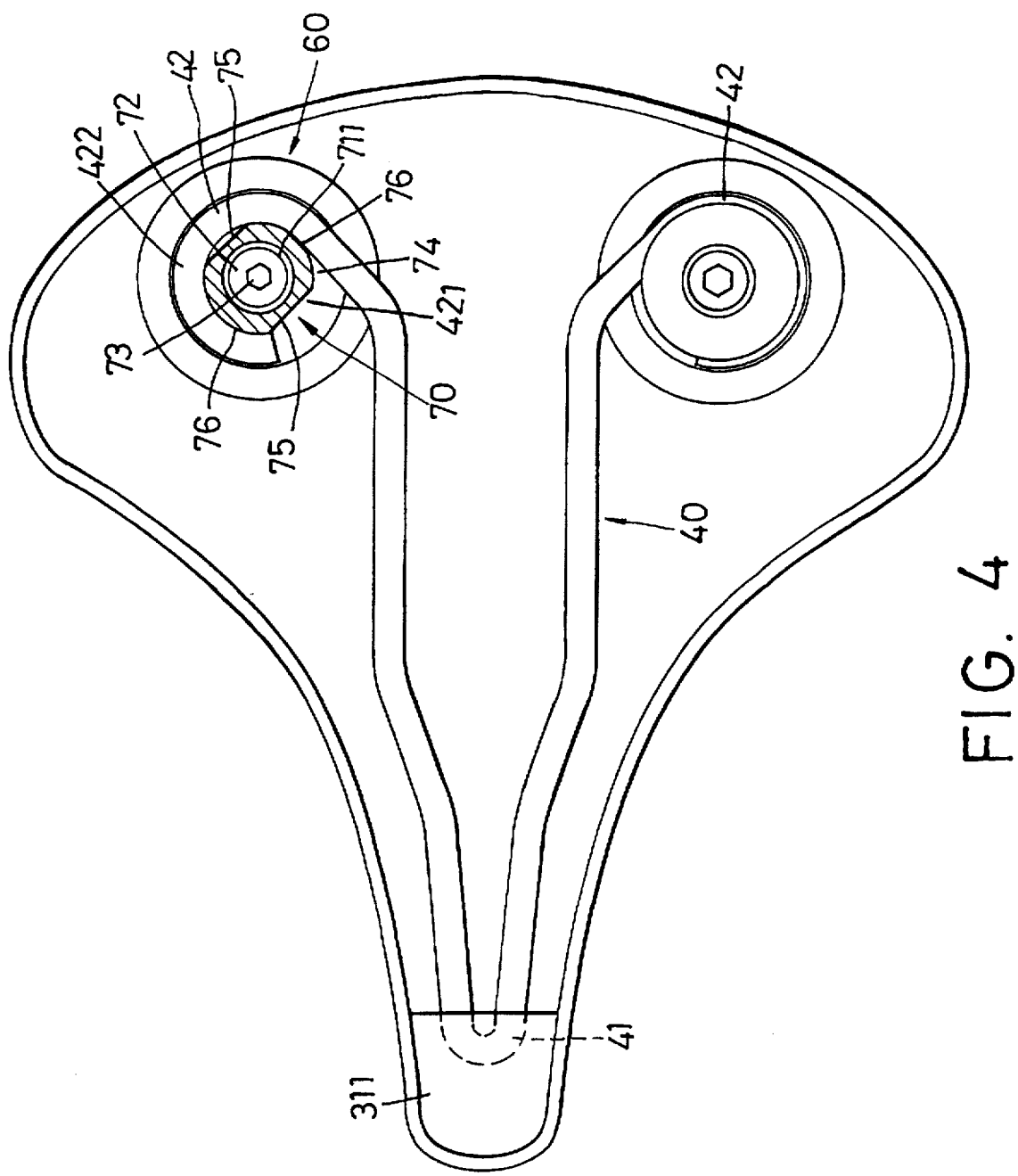
Figure 5:
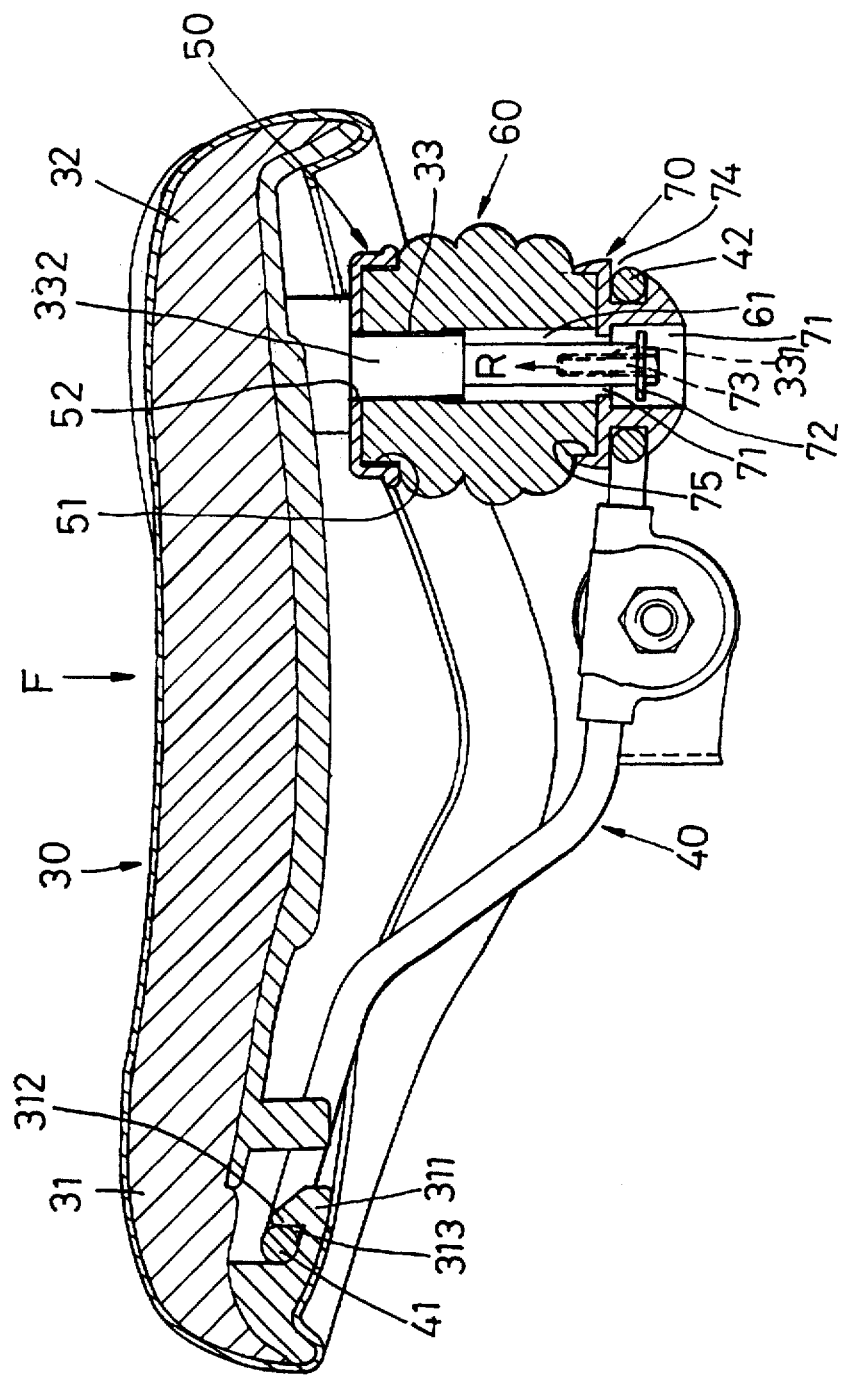

FIG. 3 is a sectional view of the preferred embodiment;

FIG. 4 is a bottom view illustrating how a support rod is mounted to the bicycle saddle of this invention; and FIG. 5 is a schematic view illustrating the action of the bicycle saddle when a load is applied thereon.

DETAILED DESCRIPTION OF THE PREFERRED EMBODIMENT

Figure 1:
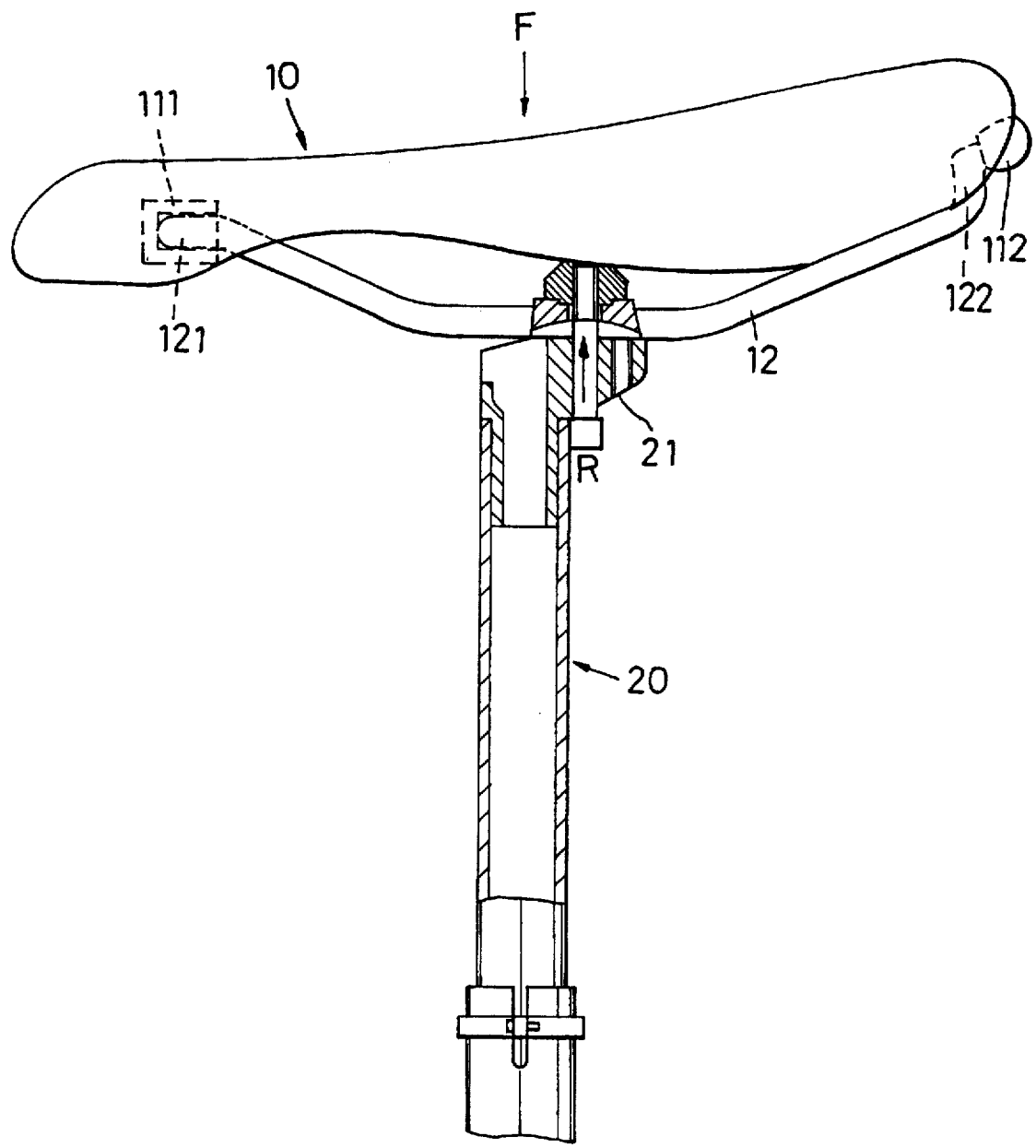
FIG. 1 is a schematic view of a conventional bicycle saddle mounted on a seat post.
Figure 2:
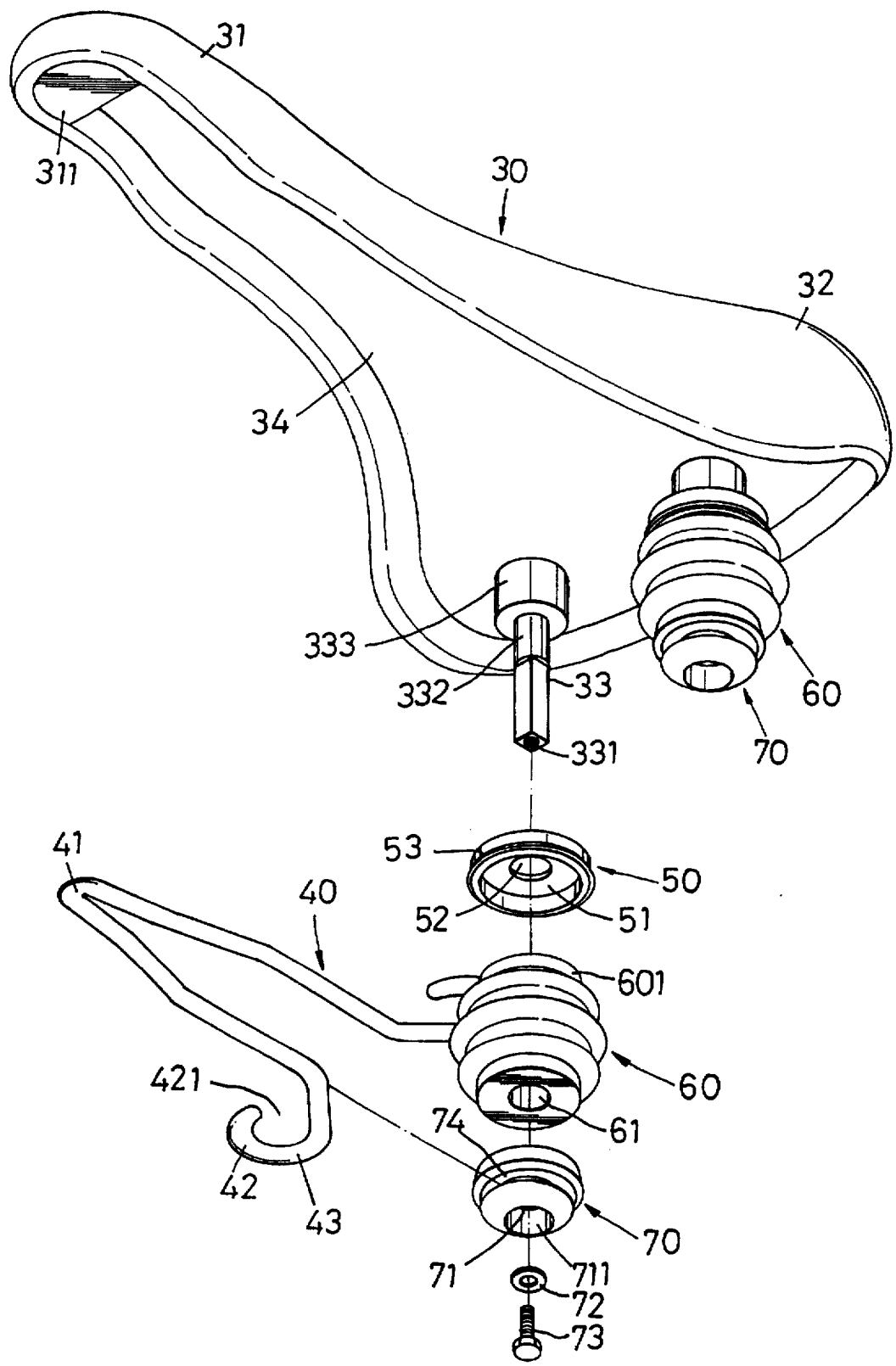
FIG. 2 is an exploded view of a preferred embodiment of the bicycle saddle according to the invention.

Referring to FIGS. 2 to 4, a bicycle saddle according to the present invention includes a rigid saddle body 30 made of a plastic material, a support rod 40, a pair of clamping covers 50, a pair of resilient members 60, and a pair of hook engaging members 70.

The rigid saddle body 30 has a front converging portion 31 and a rear diverging portion 32. A front mounting socket member 311 is formed at the bottom side of the front converging portion 31. The front mounting socket member 311 has an upwardly extending portion 312 that confines an engaging slot 313. A pair of rear mounting posts 33 are spaced apart and project downwardly from the bottom of the rear diverging portion 32. Each of the mounting posts 33 is stepped and includes a head portion 333 which is disposed immediately below the bottom side of the saddle body 30, and a neck portion 332 which is formed below the head portion 333 and which has a bottom end formed with an axial screw hole 331.

The support rod 40 is formed by bending a metal rod and is attached to the bottom side of the saddle body 30. The support rod 40 has a converging bent front end 41 to be fitted into the engaging slot 313 of the front mounting socket member 311, and two diverging arms 43 which respectively have bent hook portions 42. As shown in FIGS. 2 and 4, each of the hook portions 42 is substantially C-shaped and has an extension 422 that is formed with a discontinuation 421.

Each of the clamping covers 50 has a flat top 51 and a surrounding wall 53. The top 51 has a central hole 52 for passage of the respective rear mounting post 33, and a containing region 51 confined by the top 51 and the surrounding wall 53.

Each of the resilient members 60, which is made of an elastomeric body, such as, a polyurethane (PU) material, has an axial hole 61 to permit sleeving thereof around the neck portion 332 of one of the rear mounting posts 33, and an upper portion 601 to be received in the containing region 51.

Referring again to FIGS. 2 and 3, each of the hook engaging members 70 includes a tubular body having a peripheral wall 71b which is formed with a peripheral groove 74, and a top end plate 71a which is connected to a top end of the peripheral wall 71b for abutting against the resilient member 60. A central hole 71 is formed in the top end plate 71a, and a containing slot 711 is formed below the top end plate 71a. A screw member 73 penetrates through a washer 72 and the top end plate 71a and is then threaded into the axial screw hole 331. As such, each clamping cover 50 is clamped against the respective head portion 333 of the mounting posts 33 while the resilient member 60 is clamped between the clamping cover 50 and the respective hook engaging member 70. With reference to FIG. 4, the peripheral wall 71b of each hook engaging member 70 has parallel engaging faces 75 with a diametral distance therebetween which is smaller than that of the discontinuation 421, and opposing arched faces 76 which have a diametral distance therebetween greater than that of the discontinuation 421 and which interconnect the parallel engaging faces 75. Thus, the opposing arched faces 76 are engageable tightly with the extension 422 whereas the parallel engaging faces 75 are capable of passing through the discontinuation 421.

In assembly, as shown in FIGS. 2, 3, and 5, each clamping cover 50 is sleeved around the neck portion 332 of the corresponding mounting post 33. Each upper portion 601 of the resilient member 60 is received in the corresponding containing region 51. The bent front end 41 of the support rod 40 is mounted to the engaging slot 313 of the front mounting socket member 311. Each hook engaging member 70 is fitted into the respective hook portion 42 by passing the parallel engaging faces 75 through the discontinuation 421. Then, the hook engaging member 70 is rotated by an angle of about 90° so that the arched faces 76 engage tightly the extension 422. Finally, the hook engaging member 70 is attached to the bottom end of the rear mounting post 33 below the resilient member 60 by means of the screw member 73 and the washer 72. The assembly as such is easy and does not require a large applied force.

In use, when there is a load on the saddle body 30, a force (F) is transmitted to each rear mounting post 33 so that the rear mounting posts 33 and the clamping covers 50 move downwardly to press against the resilient members 60. The force (F) is then transmitted to the hook engaging members 70 through the resilient members 60 and indirectly transmitted back to the support rod 40. When the support rod 40 receives the force (F), a counteracting force (R) is produced and is transmitted to the resilient member 60 via the hook engaging member 70. The resilient member 60 is thereby pressed and deformed to absorb the shock caused by the counteracting force (R).

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A bicycle saddle comprising:
   a saddle body having a front converging portion and a rear diverging portion;
   a front mounting socket member formed at a bottom side of said front converging portion;
   a pair of rear mounting posts which are spaced apart and which project downwardly from a bottom side of said rear diverging portion;
   a support rod which has a converging bent front end to be mounted to said front mounting socket member and two diverging arms with hook portions to be mounted on said rear mounting posts, respectively; and
   a pair of hook engaging members, each of which has a peripheral groove, each of said hook portions extending around one of said hook engaging members and being received in said peripheral groove;
   said hook engaging members being mountable on said mounting posts respectively after engaging said bent hook portions;
   a pair of resilient members respectively sleeved around said mounting posts to cushion said hook engaging members;
   wherein each of said mounting posts is stepped and includes a head portion disposed immediately below the bottom side of said rear diverging portion of said saddle body, and a neck portion below said head portion.

2. A bicycle saddle as claimed by claim 1, wherein said resilient members are elastomeric bodies, each of which is disposed around said neck portion of the respective one of said mounting posts between said head portion and the respective one of said hook engaging members.

3. A bicycle saddle as claimed by claim 2, further comprising means for clamping said elastomeric bodies and said hook engaging members against said head portions of said mounting posts, respectively.

4. A bicycle saddle as claimed by claim 3, wherein each of said hook engaging members comprises a tubular body having a central hole, a peripheral wall formed with said peripheral groove, and a top end plate formed at a top end of said peripheral wall to abut against the respective one of said elastomeric bodies, said neck portion having a bottom end formed with an axial screw hole, and a screw member penetrating through said top end plate and engaging said axial screw hole.

5. A bicycle saddle as claimed by claim 1, wherein each of said hook portions is substantially c-shaped and has an extension formed with a discontinuation, each of said hook engaging members being turnable about the respective one of said mounting posts, said peripheral wall of each of said hook engaging members having parallel engaging faces and opposing arched faces that interconnect said parallel engaging faces, said parallel engaging faces forming a distance that is smaller than said discontinuation for passage of said hook engaging member through said discontinuation, said arched faces forming a distance that is greater than said discontinuation, said arched faces of each of said hook engaging members being engageable tightly with said extension.

* * * * *